United States Patent
Klatt et al.

[11] 3,966,657
[45] June 29, 1976

[54] AMBIENT TEMPERATURE COMPENSATED RESIN-HARDENER FILLERS

[75] Inventors: Kenneth G. Klatt, Brown Deer; Ronald L. Walling, Sussex; James R. Hallstrom, Brookfield, all of Wis.

[73] Assignee: Rexnord Inc., Milwaukee, Wis.

[22] Filed: Feb. 5, 1974

[21] Appl. No.: 439,746

[52] U.S. Cl. .................... 260/29.2 EP; 260/47 EP
[51] Int. Cl.² .................................... C08G 51/24
[58] Field of Search ............... 260/29.2 EP, 47 EP, 260/47 EN, 2 EP, 2 N, 96 R, 59

[56] References Cited
UNITED STATES PATENTS

| | | | |
|---|---|---|---|
| 2,811,495 | 10/1957 | Wittcoff | 260/29.2 EP |
| 3,310,511 | 3/1967 | Reinert | 260/29.2 EP |
| 3,806,483 | 4/1974 | Juba | 260/47 EP |

Primary Examiner—Murray Tillman
Assistant Examiner—T. Pertilla
Attorney, Agent, or Firm—Kinzer, Plyer, Dorn & McEachran

[57] ABSTRACT

A method and product for compensating ambient temperatures and altering the working time and curing time of a thermosetting resin-hardener compound which is accomplished by selecting and adding a diluent to the resin or hardener blend according to the ambient temperature so that when the resin blend and the hardener blend are intermixed, a heat change is produced which counteracts the effect of the ambient temperature.

6 Claims, 1 Drawing Figure

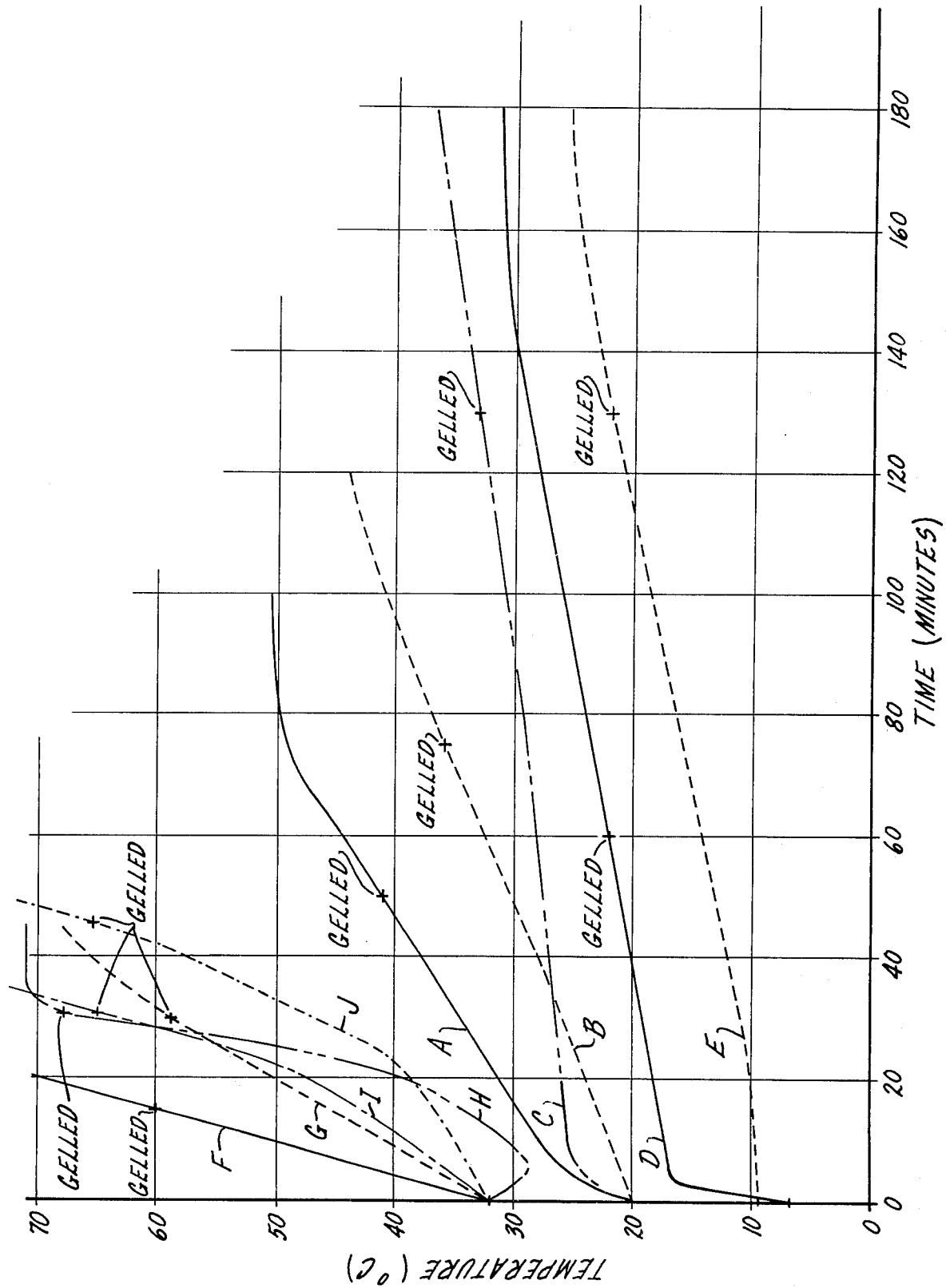

AMBIENT TEMPERATURE COMPENSATED RESIN-HARDENER FILLERS

BACKGROUND OF THE INVENTION

This invention relates generally to thermosetting resin-hardener filling or coating systems and more particularly concerns such systems which require fast curing times and accordingly where the working time of the resin is quite short and therefore extremely sensitive to ambient temperature.

The invention applies to at least two package systems where the resin and the hardener are in separate packages and are not intermixed to form a filling compound until just prior to being applied to a working area.

The working life or useful life of a compound such as a thermosetting resin-hardener intermix can be measured from the point at which the resin is first intermixed with its hardener or catalyst until it reaches a state of no longer being workable or applicable to its end use. In some instances, the working life may be different from the pot life when the compound is allowed to sit for a while in the container before spreading on the working area for filling or coating. In either case, as time passes the compound becomes thicker until it becomes unworkable, in other words it becomes so thick that it begins to crumble or cannot be evenly applied.

The types of filling or coating compounds that the invention is concerned with are formulated for applications in which an extremely fast curing rate and accordingly fast set time is necessary, such as in areas where there is only a limited time before the surface must be ready for foot traffic, truck or wear. Normally these applications are in places where heat or temperature cannot be controlled or cover such large areas that temperature control is infeasible. Consequently, the curing compound is subject to the ambient temperature which may be the indoor room temperature or the outdoor temperature, both of which may vary during storage, use and curing of the blends or compound.

As is well known, small changes in temperature can raise havoc in the reaction rate of many chemical systems. Thus, for a change of temperature of 10°C. the rate of reaction is usually doubled or halved depending on whether there is an increase or decrease in temperature respectively. Moreover, seasonal temperature changes make a system which gives desired working and curing times in summer take too long to cure in winter; similarly a system with an adequate working time in winter can have an undesirably short working time in summer.

Accordingly, a method and a set of products are presented in the instant invention which allow a user to choose an appropriate set of resins, diluents, and hardeners according to the ambient temperature at time of application of the compound. In the preferred embodiment a single resin diluent blend is utilized all year round or for different ambient temperatures, and a hardener blend is selected according to the ambient temperature. Thus one hardener is used for high temperatures and another hardener is used for low temperatures. However, other systems may be designed using the principles of the invention to vary any of the components of the system so that different resins or diluents can be utilized. Resins, diluents and hardeners can be selected to achieve the proper working and cure times for any critical ambient temperature range.

SUMMARY OF THE INVENTION

In accordance with the invention, a method of altering the working time and curing time of an epoxy filling compound to compensate for a given ambient temperature at time of application, includes forming a resin blend including a cross-linkable resin; forming a hardener blend including a cross-linking agent; selecting a diluent by comparing the heat change produced by the intermixture of the diluent and the cross-linking agent with the heat change produced by the intermixture of the diluent and the cross-linking resin, and either blending the diluent with the resin blend if the heat change of the intermixture of the diluent and the cross-linkable resin has a lesser effect on the given ambient temperature than the heat change of the intermixture of the diluent and the cross-linking agent or blending the diluent with the hardener blend if the heat change of the intermixture of the diluent and the cross-linking agent has a lesser effect on the given ambient temperature than the heat change of the intermixture of the diluent and the cross-linking resin; and, intermixing, just prior to application to a working area, the resin blend with the hardener blend to obtain a curable filler compound with a working time and curing time compensated for the given ambient temperature at time of application.

Thus, selection of hardeners, resins and diluents is made according to the heat change produced upon their intermixture and shortly thereafter. If the heat change is exothermic, the diluent-resin or hardener pair is utilized to speed the working and curing times for low ambient temperature applications. Similarly, if the heat change is endothermic the diluent-resin or hardener pair is utilized to delay the working and curing times for high ambient temperature applications. Once selection of the desired diluent-hardener or diluent-resin pair is made, then each member of the pair must be separated into separate blends so that they will not be intermixed until just prior to application in the area of the ambient temperature.

Other considerations are necessary since the hardener if mixed with the resin will start to cure immediately, and many resins and diluents are incompatible. Therefore if the resin and the diluent are in a single blend, the resin must be compatible with the diluent and the resin blend must be stable. Moreover, the resin blend must be separated from the hardener or hardener blend until prior to use. In the preferred embodiment, cement is included in the system and is cured by water. Thus, the cement and water must be separated into stable blends.

BRIEF DESCRIPTION OF THE DRAWING

The drawing shows various curves A–J of temperature vs. time for several thermosetting systems.

DETAILED DESCRIPTION OF THE INVENTION

Patching, filling and coating mixtures are often used for concrete and other surfaces on floors, ramps, floating docks, walls and foundations. Often, these areas can be isolated for only a few hours or days and require quick curing filling compounds. Typically these compounds are separated into two separate blends: one blend package containing the thermosetting resin and filler, and the other blend package containing a hardener. When the two blends are intermixed together just prior to application, hardening or setting of the compound begins immediately. As the viscosity or setting of the compound progresses the compound becomes workable and then unworkable, finally curing. The compound may continue to cure or set and increase in strength, even after it is hard to the touch, for weeks or months reaching a final ultimate strength.

The thermosetting resin may be any which has a stability in the diluent selected and can be cured by the selected hardener. A particularly preferred resin belongs to the group consisting of difunctional epoxy or polyepoxy resins. When the diluent is water the preferred group is epoxy resins which are stable in water. Complementary curing compounds of different resins and different curing agents are preferred. For example, cement which is also cured by water is utilized along with an epoxy resin to form a quick setting compound. When complementary curing compounds are used, however, care should be taken in selecting those which are compatable with each other and do not defeat the other's curing action. In the case of cement, the heat of hydration by the water which takes place after a short period of time, accelerates the reaction rate of the epoxy resin and so a complementary effect is obtained. Some epoxy resins used are: diglycidylethers of Bisphenol-A (DGEBA), such as D.E.R. 330, manufactured by Dow Chemical Corp.; a trifunctional epoxy resin, such as Dow XD 7342, manufactured by Dow Chemical Corp.; D.E.R. 218, manufactured by Dow Chemical Corp.; epoxidized dimer of a fatty acid, such as Epon 871, manufactured by Shell; Epon 826, manufactured by Shell. The epoxy resins herein comply with the definition given in the *Handbook of Epoxy Resins* by Lee and Neville (1967) page 1–2 of "any molecule containing more than one $\alpha$-epoxy group capable of being converted to thermoset form".

Normal brands of cement such as gray or white Portland cement or other mixtures of sinterered silicates and metallic oxides which set with water can be used. Mixtures of cement with calcium sulfate or other inorganic salts are also useful as a complementary curing compound.

The diluent should be compatable with both the thermosetting resin and the hardener and the relationship between the diluent and the hardener or the resin must be selected for the specific application. A preferred diluent is water. Other diluents are utilized when they complement the other components of the system.

The preferred hardeners can be selected from the group of polyamides, polyamidoamines, polyamines, diamides, diamines, tertiary amines or mixtures thereof. Anhydrides can be added to any of these mixtures. However any cross-linking agent or hardener can be utilized according to the cross-linkable resin used. In preferred embodiments, mixtures of hardeners are used to give the desired heat change to compensate for ambient temperature.

Since the reaction between the resin and hardener gives off heat as it takes place, as this reaction starts, the heat from the resin-hardener reaction will encourage an increased curing by speeding the reaction rate. Similarly when cement and water are utilized, the setting of the cement gives off heat which accelerates the resin-hardener reaction accordingly. However, there is a time lag between the intermixture of the components before any sufficient amount of heat is produced by either the resin-hardener reaction or the cement-water reaction. Accordingly, the heat caused by the intermixture plays a significant role in initiating or kicking off the other two reactions. In the past, the initiation of the resin-hardener reaction or cement-water reaction was contingent upon the ambient temperature. Since the initial reaction rates are very slow, the ambient temperature played a large effect upon the working and the setting times. Now the heat change produced at the time of intermixture is utilized and plays a significant role in the initiation of the reactions. It has been noted that for the intermixture of the hardener or resin and the diluent, the heat change substantially occurs within two minutes of intermixture. For a complete system with all components, such as cement and fillers included, the heat change substantially occurs within five minutes. This is the heat change which the present invention is concerned with as opposed to the heats of hydration of cement or the heat of the resin-hardener reaction which generally do not occur until after a short time, usually more than ten minutes.

By proper selection and separation of components, a large heat input can be utilized for low ambient temperatures and a large heat outtake can be utilized for high ambient temperatures. In this regard it seems that for every ten degrees centigrade in ambient temperature, in order to end up with working times and curing times similar to those at 20°C (70°F), the heat change should be approximately 300–400 calories when 20 grams of hardener or resin are added to 100 cc of diluent. This takes into account compositions essentially similar to the ones of Example 1 or 2 which include cement, epoxy resins, and water as the diluent. For other systems with faster initiation times or slower as the case may be, it may be necessary to choose resin or hardener-diluent combinations with higher or lower total heat changes since they will be affected by the other components, fillers and diluents. Some preferred hardeners and the heat changes produced are listed in Table 1, tests were conducted in accordance with, *Experiments in Physical Chemistry*, 2nd. Ed., Shoemaker, David P. and Garland, Carl W., pp. 117–125.

TABLE 1

| Hardener | | | Diluent | | | Heat Change Upon Intermixture |
|---|---|---|---|---|---|---|
| 50 | gm. | Unirez 2810 | 100 | gm. | $H_2O$ | −3637.22 cal. |
| 16.66 | gm. | D.M.P. 30 | 100 | gm. | $H_2O$ | − 977.70 cal. |
| 50 | gm. | Unirez 2810 and | | | | |
| 16.66 | gm. | D.M.P. 30 | 100 | gm. | $H_2O$ | −3121.35 cal. |
| 15 | gm. | triethylenetetra-amine | 100 | gm. | $H_2O$ | −4445.59 cal. |
| 16 | gm. | metaphenylene-diamine | 100 | gm. | $H_2O$ | + 527.22 cal. |
| 41 | gm. | imidazole | 100 | gm. | $H_2O$ | +1442.68 cal. |
| 13 | gm. | dicyanamide | 100 | gm. | $H_2O$ | + 409.53 cal. |
| 50 | gm. | metaphenylene diamine | 100 | gm. | triethylene-tetraamine | + 625.53 cal. |

For Comparison:

TABLE 1-continued

| | Hardener | | | Diluent | | Heat Change Upon Intermixture |
|---|---|---|---|---|---|---|
| 100 | gm. | H₂O | 200 | gm. | cement | − 326.39 cal. |
| 100 | gm. | Resin Blend of Ex. 1 | 109.1 | gm. | Hardener Blend of Ex. 1 | − 329.80 cal. |
| 111 | gm. | D.E.R. 330 | 100 | gm. | H₂O | + 40.36 cal. |

Accordingly, a hardener such as Unirez 2810 would not be added to a resin water blend until just prior to application at which time the intermixture of the components would provide a large heat input within a short time into the mixed compound which would tend to decrease the working time and curing time. Thus, this particular hardener would be useful at low ambient temperatures. On the other hand for high ambient temperatures imidazole would be utilized because it would delay the working time and curing time by absorbing heat upon intermixture.

D.M.P. 30 is a 2,4,6-Tri(dimethylaminomethyl) phenol, manufactured by Rohm and Haas Co. It is a tertiary amine which opens the epoxy linkage and accelerates the epoxy reaction. Unirez 2810 is a polyamidoamine tall oil derivative manufactured by Union Camp Chemical Co.

While the invention will be described in connection with the following examples, it will be understood that it is not intended to limit the invention to these examples. On the contrary it is intended to cover all alternatives, modifications and equivalents as may be included within the spirit and scope of the invention as defined by the appended claims.

Example 1: Damp solid blend - liquid blend intermix:

A resin blend was prepared by thoroughly mixing:

| | |
|---|---|
| 2.625 lbs. | epoxy resin (liquid) (D.E.R. 330) |
| 2.365 lbs. | water |
| 7.880 lbs. | limestone (solid) |
| 0.105 lbs. | surfactants (Span 20* -Tween 20*) |
| 0.025 lbs. | anti-caking agent (Santocel Z) |

This blend was essentially a liquid dispersion.

A hardener blend was prepared by thoroughly mixing:

| | |
|---|---|
| 4.730 lbs. | cement |
| 7.880 lbs. | sand (20-30 mesh) |
| 1.180 lbs. | amine (liquid) (Unirez 2810) |
| 0.395 lbs. | accelerator for epoxy cure (liquid) (D.M.P. 30) |

This blend was dampened by the liquids, but essentially a moist solid since the solids greatly outweighed the liquids.

After equilibrating at ambient temperature, the second blend was intermixed with the first blend to give a curable compound. After waiting ten minutes the compound was trowled into a crack in a concrete floor at a temperature of 72°F.

Example 2: Dry solid blend - liquid resin blend - liquid hardener blend intermix:

A resin blend was prepared by thoroughly mixing:

| | |
|---|---|
| 2.625 lbs. | epoxy resin (liquid) (D.E.R. 330) |
| 2.365 lbs. | water |
| 7.880 lbs. | limestone (solid) |
| 0.105 lbs. | surfactants (Tween 20, Span 20) |
| 0.025 lbs. | anti-caking agent (Santocel Z) |

A liquid dispersion was obtained.

A solid blend was prepared by thoroughly mixing:

| | |
|---|---|
| 4.730 lbs. | cement |
| 7.880 lbs. | sand |

A hardener blend was prepared by thoroughly mixing:

| | |
|---|---|
| 1.180 lbs. | amine (liquid) (Unirez 2810) |
| 0.395 lbs. | accelerator (liquid) (D.M.P. 30) |

All these blends were allowed to equilibrate at ambient temperature and were simultaneously intermixed to give a curable compound. After waiting ten minutes, the compound was trowled upon a floor to give a half inch coating. The compound was workable for 20 minutes at an ambient temperature of 72°F.

Example 3: Neutral heat of intermixture of hardener and diluent:

A resin blend was prepared by thoroughly mixing:

| | |
|---|---|
| 2.625 lbs. | epoxy resin (liquid) (D.E.R. 330) |
| 7.880 lbs. | limestone (solid) |
| 0.105 lbs. | surfactants (Tween 20, Span 20) |
| 0.025 lbs. | anti-caking agent (Santocel Z) |

A liquid dispersion was obtained.

A solid blend was prepared by thoroughly mixing:

| | |
|---|---|
| 4.730 lbs. | cement |
| 7.880 lbs. | sand |

A hardener blend was prepared by thoroughly mixing:

| | |
|---|---|
| 1.180 lbs. | amine (liquid) (Unirez 2810) |
| 0.395 lbs. | accelerator (liquid) (D.M.P. 30) |
| 2.365 lbs. | water |

All these blends were allowed to equilibrate at ambient temperature and were simultaneously intermixed to give a curable compound. The heats of intermixture for the components are less than about 300–400 cal. for 20 gm. added to 100 cc of water.

Example 4: Dry solid blend - liquid resin blend - liquid hardener blend intermix:

A resin blend was prepared by thoroughly mixing:

| | |
|---|---|
| 2.625 lbs. | epoxy resin (liquid) (D.E.R. 330) |
| 2.365 lbs. | water |
| 7.880 lbs. | limestone (solid) |
| 0.105 lbs. | surfactants (Tween 20, Span 20) |
| 0.025 lbs. | anti-caking agent (Santocel Z) |

A liquid dispersion was obtained.

A solid blend was prepared by thoroughly mixing:

| | |
|---|---|
| 4.730 lbs. | cement |

-continued

| | |
|---|---|
| 7.880 lbs. | sand |

A hardener blend was prepared by thoroughly mixing:

| | |
|---|---|
| 1.180 lbs. | amine (liquid) (Unirez 2810) |
| 0.395 lbs. | imidazole |

All these blends were allowed to equilibrate at ambient temperature and were simultaneously intermixed to give a curable compound.

Example 5: Endothermic intermixture for high temperatures.

A resin blend was prepared by thoroughly mixing:

| | |
|---|---|
| 2.625 lbs. | epoxy resin (liquid) (D.E.R. 330) |
| 7.880 lbs. | limestone (solid) |
| 0.105 lbs. | surfactants (Tween 20, Span 20) |
| 0.025 lbs. | anti-caking agent (Santocel Z) |

A liquid dispersion was obtained.
A solid blend was prepared by thoroughly mixing:

| | |
|---|---|
| 4.730 lbs. | cement |
| 7.880 lbs. | sand |
| 1.101 lbs. | imidazole |

A hardener blend was prepared by thoroughly mixing:

| | |
|---|---|
| 1.180 lbs. | amine (liquid) (Unirez 2810) |
| 0.395 lbs. | accelerator (liquid) (D.M.P. 30) |
| 2.365 lbs. | water |

All these blends were allowed to equilibrate at an ambient temperature and were simultaneously intermixed to give a curable compound.

Example 6: Non-Water Single Curing Resin, Neutral Intermix:

A resin blend was prepared by thoroughly mixing:

| | |
|---|---|
| 2.625 lbs. | epoxy resin (liquid) (D.E.R. 330) |
| 7.880 lbs. | limestone (solid) |
| 0.025 lbs. | anti-caking agent (Santocel Z) |

A solid blend was prepared by thoroughly mixing:

| | |
|---|---|
| 3.940 lbs. | sand |

A hardener blend was prepared by thoroughly mixing:

| | |
|---|---|
| 0.220 lbs. | metaphenylenediamine |
| 0.342 lbs. | triethylenetetraamine |

All these blends were allowed to equilibrate at ambient temperature and were simultaneously intermixed to give a curable compound.

Example 7: Non-Water Single Curing Resin, Endothermic Intermix:

A resin blend was prepared by thoroughly mixing:

| | |
|---|---|
| 2.625 lbs. | epoxy resin (liquid) (D.E.R. 330) |
| 7.880 lbs. | limestone (solid) |
| 0.025 lbs. | anti-caking agent (Santocel Z) |

A solid, hardener blend was prepared by thoroughly mixing:

| | |
|---|---|
| 3.940 lbs. | sand |
| 0.220 lbs. | metaphenylenediamine |

A hardener blend was prepared by thoroughly mixing:

| | |
|---|---|
| 0.342 lbs. | triethylenetetraamine |

The drawing shows plots of temperature vs. time for several systems using various blends and separations. The blends of Examples 2, 3 and 4 were allowed to equilibrate at ambient temperatures of 20°C., 7°C and 32°C. and then intermixed. Those systems utilizing an exothermic intermix like Example 2 showed a quick temperature rise due to the principles of the invention while those utilizing the neutral intermix like Example 3 did not show a quick temperature increase. Example 5 utilized an endothermic intermix at 32°C.

The gelled time was measured by the time when the compound no longer adhered to a metal spatula inserted into and withdrawn from a 3 gallon can containing 2 gallons of compound. Although working time will vary according to the standards of the user, working time can usually be approximated at about 40% the gelled time. Curing times will correspondingly vary according to the gelled time, thus a longer time before gelling means a longer time for curing.

The blends of the corresponding examples were intermixed at time equal to zero and the temperature of the resulting compound was measured.

Curve A shows a system composed as in Example 2 intermixed at 20°C. ambient temperature (68°F.) which gives a gelled time of 50 minutes and an approximate working time of 20 minutes. Curve B shows a system composed as in Example 3 where the heat of mixing the diluent and the hardener is not utilized upon intermixture. The gelled time is approximately 75 minutes. Curve C shows a system composed as in Example 4 where imidazole an endothermic hardener when diluted in water is substituted for D.M.P. 30 an exothermic hardener. As can be seen the gelled time is extended to 130 minutes, well beyond the gelled time of Curve B which utilized a neutral heat change. Thus, imidazole is useful at high temperatures to prolong the working and curing times.

At an ambient temperature of 7°C. (45°F.), Curve D shows an Example 2 intermix and at an ambient temperature of 9°C (48°F) Curve E shows an Example 3 intermix. Thus, it is seen that the use of the heats of mixture decrease the gelled time from 132 minutes to 60 minutes and the approximate working time from about 53 minutes to 24 minutes. A similar decrease in the curing time can be expected and it is seen that a system like Example 2 is greatly beneficial at low ambient temperatures.

At ambient temperatures of 32°C. (90°F), Curve F shows an Example 2 intermix, and Curve G shows an Example 3 intermix. Curve F has about a 6 minute working time, since it shows the use of an exothermic hardener-diluent combination. Although Curve G with a 12 minute working time has a more desirable working time due to its neutral intermix character, the best system for high temperatures is an endothermic hardener-diluent combination such as in Example 5 or other combinations picked in accordance with Table 1 or the principles of the present invention. Curve H shows an endothermic intermix of Example 5 with a quick decrease in temperature. The gelled time is about the same as that of Curve G, but it should be noted that the only difference between the Examples which were run to give Curve G and Curve H was that additional hardener was included in Example 5 of Curve H, thus there is more heat of reaction to be expected and as is seen after 15 minutes, the rate of reaction for Curve H exceeds that of Curve G. Since the approximate working times of both curves F and G ended at about 43°C and Curve H doesn't reach 43°C until 22 minutes and is substantially below Curve G during that period of time it can be seen that Curve H provides a longer working time than Curve G, even with extra hardener.

Curves I and J are both run at ambient temperatures of 32°C and are based on Examples 6 and 7, respectively. Even though these are non-water systems, do not include a complementary curing component such as cement, and have hardeners with different curing rates, it can be seen that the principles of the invention still apply to the system. Thus, Curve I — Example 6 shows a neutral intermix which gelled faster than the endothermic intermix of Curve J — Example 7.

Thus it is apparent that there has been provided, in accordance with the invention, a method and product that fully satisfies the objects, aims, and advantages of the invention. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method of altering the working time of an epoxy filling compound to compensate for ambient temperatures comprising:
    forming a stable resin blend including a cross-linkable epoxy resin and water, wherein the epoxy resin contains more than one alpha-epoxy group capable of being converted to thermoset form;
    selecting a cross-linking agent for the epoxy resin from the group consisting of water soluble polyamines, water soluble polyamides, water soluble polyamidoamines, water soluble tertiary amines, or mixtures thereof according to the heat change produced by intermixing water with the cross-linking agent, said selection being made so that the heat change produced by intermixing water and said agent counteracts the effect of the ambient temperature on the working time and curing time; thoroughly intermixing said agent with a mixture of cement and sand to afford a hardener blend; and,
    intermixing just prior to application to a working area, said resin blend with said hardener blend to obtain a curable compound with a compensated working time and curing time.

2. A method of altering the working time of an epoxy filling compound to compensate for ambient temperatures comprising:
    forming a stable resin blend including a cross-linkable epoxy resin and water, wherein the epoxy resin contains more than one alpha-epoxy group capable of being converted to thermoset form;
    forming a solid filler blend;
    forming a hardener blend including a cross-linking agent for the epoxy resin selected from the group consisting of water soluble polyamines, water soluble polyamides, water soluble polyamidoamines, water soluble tertiary amines, or mixtures thereof according to the heat change produced by intermixing the cross-linking agent with water so that the heat change produced counteracts the effect of ambient temperature on the working time and curing time; and,
    combining the solid filler blend and hardener blend and intermixing just prior to application to a working area, the resin blend therewith to obtain an epoxy filling compound with a compensated working time and curing time.

3. A method as in claim 2 for use at high ambient temperatures wherein, the heat change produced by intermixing water and the cross-linking agent is endothermic.

4. A method as in claim 2 wherein the heat change is greater than approximately 300–400 calories when 20 gm. of cross-linking agent are intermixed with 100 cc of water.

5. A method as in claim 4 for use at low ambient temperatures, wherein, the heat change produced by intermixing water and the cross-linking agent is exothermic.

6. A method as in claim 5 wherein the heat change is greater than approximately 300–400 calories when 20 gm. of cross-linking agent are intermixed with 100 cc of water.

* * * * *